US009173021B2

United States Patent
Zurek et al.

(10) Patent No.: US 9,173,021 B2
(45) Date of Patent: Oct. 27, 2015

(54) METHOD AND DEVICE FOR ADJUSTING AN AUDIO BEAM ORIENTATION BASED ON DEVICE LOCATION

(71) Applicant: Google Technology Holdings LLC, Mountain View, CA (US)

(72) Inventors: Robert A Zurek, Antioch, IL (US); Joseph C Dwyer, Downers Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 127 days.

(21) Appl. No.: 14/048,088

(22) Filed: Oct. 8, 2013

(65) Prior Publication Data

US 2014/0277650 A1     Sep. 18, 2014

Related U.S. Application Data

(60) Provisional application No. 61/828,779, filed on May 30, 2013, provisional application No. 61/776,793, filed on Mar. 12, 2013, provisional application No. 61/798,097, filed on Mar. 15, 2013.

(51) Int. Cl.

| G06F 17/00 | (2006.01) |
| H04R 3/00 | (2006.01) |
| H04W 4/04 | (2009.01) |
| H04R 1/32 | (2006.01) |
| G01C 21/36 | (2006.01) |

(52) U.S. Cl.
CPC .. *H04R 3/00* (2013.01); *H04R 1/32* (2013.01); *H04W 4/046* (2013.01); *G01C 21/3608* (2013.01); *H04R 3/005* (2013.01); *H04R 2499/13* (2013.01)

(58) Field of Classification Search
CPC   H04F 3/005; H04R 2430/25; H04R 2499/13; H04R 29/005; B60R 16/0373; G10K 11/34; G10L 2021/02166
See application file for complete search history.

(56) References Cited

U.S. PATENT DOCUMENTS

| 2002/0031234 | A1 | 3/2002 | Wenger et al. |
| 2008/0259731 | A1 | 10/2008 | Happonen |
| 2009/0055180 | A1 | 2/2009 | Coon et al. |
| 2012/0065973 | A1 | 3/2012 | Cho et al. |
| 2012/0288126 | A1 | 11/2012 | Karkkainen et al. |

FOREIGN PATENT DOCUMENTS

| EP | 0932023 A1 | 7/1999 |
| WO | WO2006046085 A1 | 5/2006 |

OTHER PUBLICATIONS

International Search Report and Written Opinion issued in PCT/US2014/013973, mailed May 12, 2014, 12 pages.

*Primary Examiner* — Andrew C Flanders
(74) *Attorney, Agent, or Firm* — Faegre Baker Daniels LLP

(57) ABSTRACT

A method is performed in an electronic device for orienting an audio beam generated by the device. The method includes: detecting that the device is coupled to a docking station; and determining a geographic location of the device. The method further includes determining, based on the geographic location of the device, an orientation for an audio beam relative from the docking station; and generating the audio beam by the device.

21 Claims, 7 Drawing Sheets

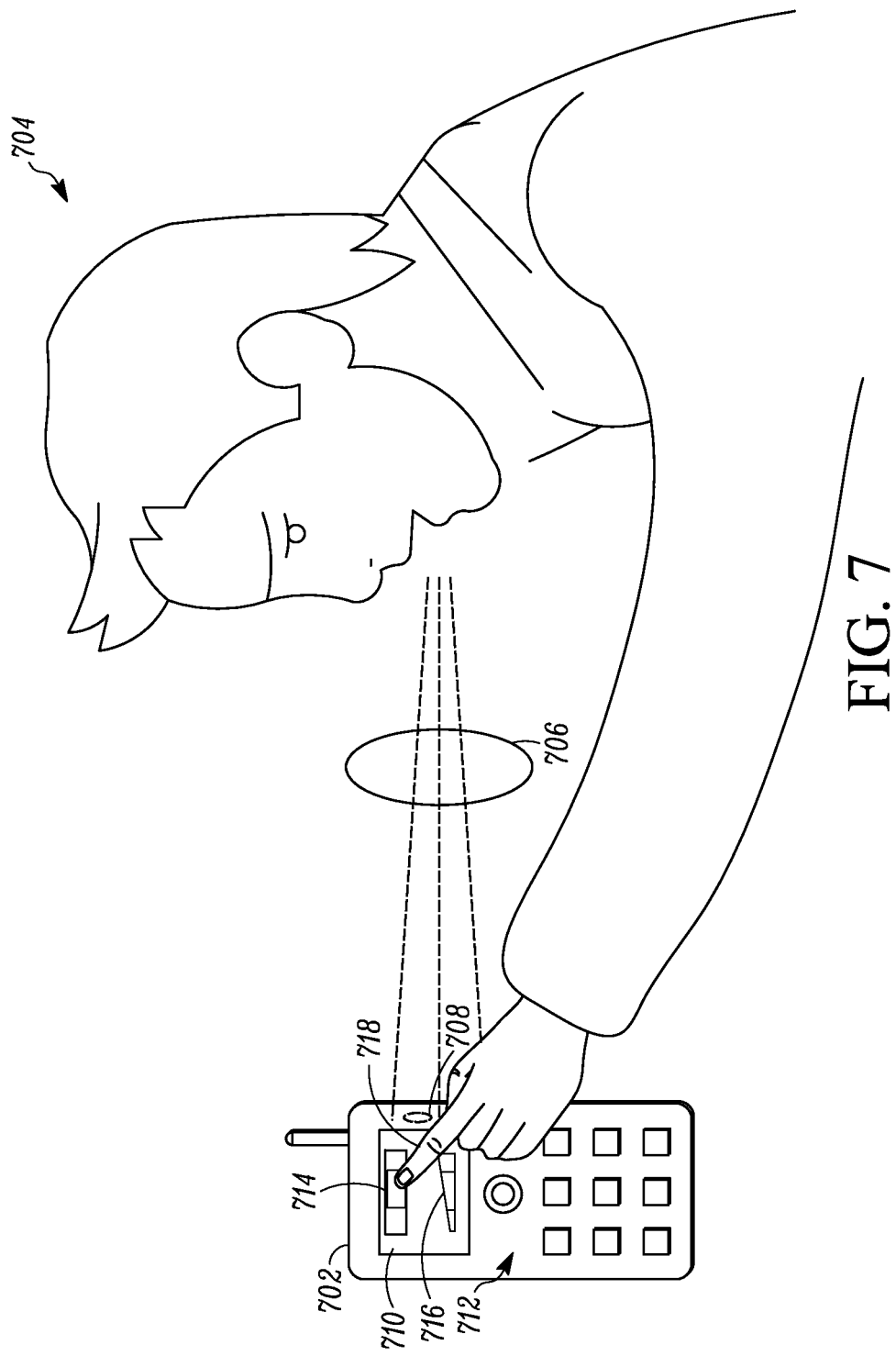

METHOD AND DEVICE FOR ADJUSTING AN AUDIO BEAM ORIENTATION BASED ON DEVICE LOCATION

RELATED APPLICATIONS

This application is a non-provisional application of commonly assigned: U.S. Provisional Patent Application No. 61/776,793, filed on Mar. 12, 2013; U.S. Provisional Patent Application No. 61/798,097, filed on Mar. 15, 2013; and U.S. Provisional Patent Application No. 61/828,779, filed on May 30, 2013; from which benefits under 35 USC §119(e) are hereby claimed and the contents of which are hereby incorporated by reference herein.

FIELD OF THE DISCLOSURE

The present disclosure relates to electronic devices such as mobile devices and, more particularly, to methods and devices for orienting an audio beam based on a geographic location of the device.

BACKGROUND

Mobile electronic devices, such as smartphones and tablet computers, continue to evolve through increasing levels of performance and functionality as manufacturers design products that offer consumers greater convenience and productivity. One area where performance gains have been realized is in voice recognition. Voice recognition frees a user from the restriction of a device's manual interface while also allowing multiple users to access the device more efficiently. Currently, however, new innovation is required to support a next-generation of voice-recognition devices that are better able to overcome difficulties associated with noisy or otherwise complex environments, which sometimes contain multiple people.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

FIG. 7 is a schematic diagram illustrating a user operating a mobile device in order to manually adjust an audio beam orientation in accordance with the present teachings.

Figure 1:
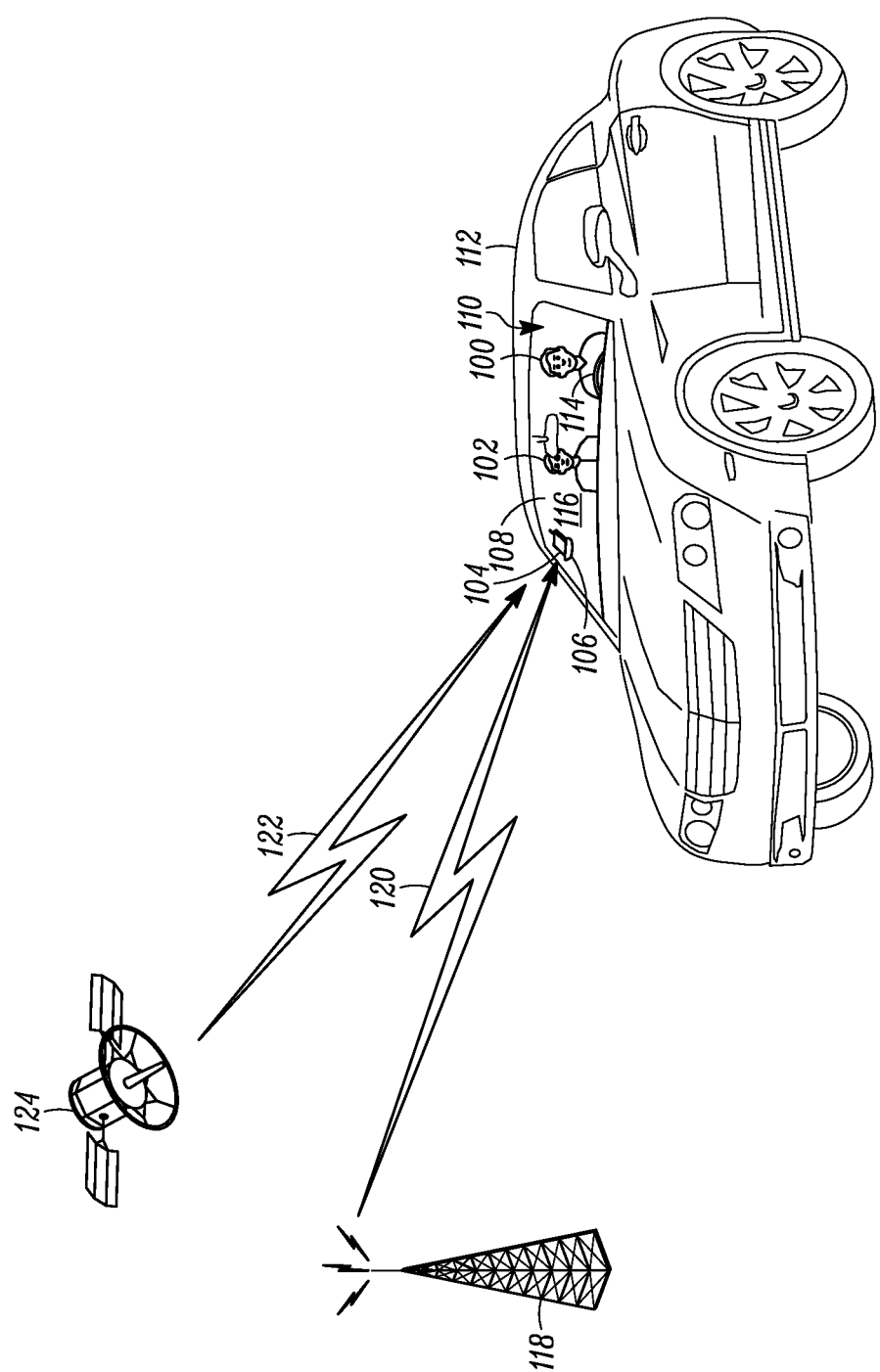
FIG. 1 is a schematic diagram of an example environment within which may be implemented methods and devices for adjusting an audio beam orientation based on device location in accordance with embodiments disclosed herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of disclosed embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Generally speaking, pursuant to the various embodiments, the present disclosure provides a method and device for orienting an audio beam based on a geographic location of the device. Upon detecting that an electronic device (also referred to herein simply as a "device") is in a docking station, for instance a docking station of a vehicle, a general geographic location is determined such as a country or region in which the device is located. In an embodiment, the geographic location is used to determine a driver side of the vehicle and to orient an audio beam generated by the device toward the driver side. Where the device user is on the driver side for that location, better microphone reception of the user's voice, for instance for voice-recognition by the device, can be automatically achieved using the present teachings.

In other embodiments, the audio beam may be further oriented either automatically or based on manual input to account for a number of variables in the environment such as, by way of example: a passenger using the device instead of the driver; the vehicle in which the device is docked having a different driver side than what is normal for the country or region in which the device is being operated; the same device capable of being docked and operated in multiple vehicles including vehicles not owned, e.g., that are rented, by the device user and/or owner, etc. At least one example benefit is a more seamless user experience with better microphone reception of user speech with enhanced noise reduction in order to improve voice recognition capabilities of the device.

Accordingly, provided in one embodiment is a method for orienting an audio beam generated by a device. The method includes: detecting that the device is coupled to a docking station; and determining a geographic location of the device. The method further includes: determining, based on the geographic location of the device, an orientation for an audio beam relative from the docking station; and generating the audio beam by the device. The method may also include determining the orientation of the device relative to the earth using sensors in order to provide the correct beamform for the device location regardless of which edge of the device is pointing up.

Also provided is a device for performing audio beam orientation adjustment. In one embodiment the device includes a docking interface configured to detect coupling of the device to a docking station and a beamformer configured to generate an audio beam. The device further includes a processor coupled to the docking interface and the beamformer and configured to determine, based on a geographic location of the device, an orientation for the audio beam relative from the docking station.

Turning now to FIG. 1, illustrated therein is a schematic diagram of an example environment within which may be implemented methods and devices for adjusting an audio beam orientation based on device location in accordance with the present teachings. In this particular embodiment, an electronic device 104, which, in this example is a mobile or portable device, is docked within a docking station 106 on a windshield 116 of a motor vehicle 112 (also referred to herein simply as a "vehicle"). Other docking station locations within the vehicle are possible, such as on a dashboard of the vehicle 112. Moreover, the motor vehicle in this case is an automobile, but can be any type of motor vehicle including, but not limited to, a Sports Utility Vehicle (SUV), a truck, a minivan, a taxicab, etc.

In this illustrative embodiment, the device 104 is further configured for establishing wireless connections 120 to other mobile or portable devices, for instance, using infrastructure equipment such as a cellular tower or base station 118. Such wireless connections 120 may be used to determine a geographic location of the device 104. The device 104 is also configured for establishing wireless connections 122 with other infrastructure equipment such as a satellite 124, wherein wireless connections 122 can also be used to determine the geographic location of the device 104. As used herein, a geographic location identifies a place or area on the Earth's surface. In an embodiment, the geographic location is identified and/or expressed as a general place or area such as a country, town, city, jurisdiction, region, municipality, locality, territory, etc. In another embodiment, the geographic location is identified or expressed as an absolute location or designation using, for example: a specific pairing of latitude and longitude, a Cartesian coordinate grid (e.g., a Spherical coordinate system), an ellipsoid-based system (e.g., World Geodetic System), or similar methods.

Also illustrated in FIG. 1 is a driver 100 seated on a driver side 110 of the vehicle 112 in front of a steering wheel 114. A passenger 102 is seated on a passenger side 108 of the vehicle 112. In general, the driver and passenger sides of a vehicle are correlated or associated with a particular geographic region or jurisdiction, such as a country in which the vehicle is expected to be driven. More particularly, universally, regulations require all bidirectional traffic in a geographic area to keep either to the right (right-hand traffic) or left (left-hand traffic) side of the road, respectively. In general, each country specifies either left-hand traffic or right-hand traffic. Accordingly, whether a country requires right-hand traffic or left-hand traffic is a "normal" traffic flow rule of the road for the country. However, for a few countries there are some exceptions to the normal traffic rule of the road. For example, the United States is a right-hand traffic country, wherein right-hand traffic is the normal traffic flow rule of the road for this country. However, an exception is traffic in the United States Virgin Islands, which, like on many Caribbean islands, drives on the left side of the road.

Accordingly, vehicles are manufactured in both left-hand drive and right-hand drive configurations, referring to the placement of the driving seat, steering wheel and controls within the vehicle. Typically, the placement of the steering wheel is opposite to the rule of the road: left-hand traffic countries use right-hand drive vehicles; and right-hand traffic countries use left-hand drive vehicles. As shown, the vehicle 112 has a left-hand drive configuration and would normally be operated in a right-hand traffic country such as the United States.

Figure 2:
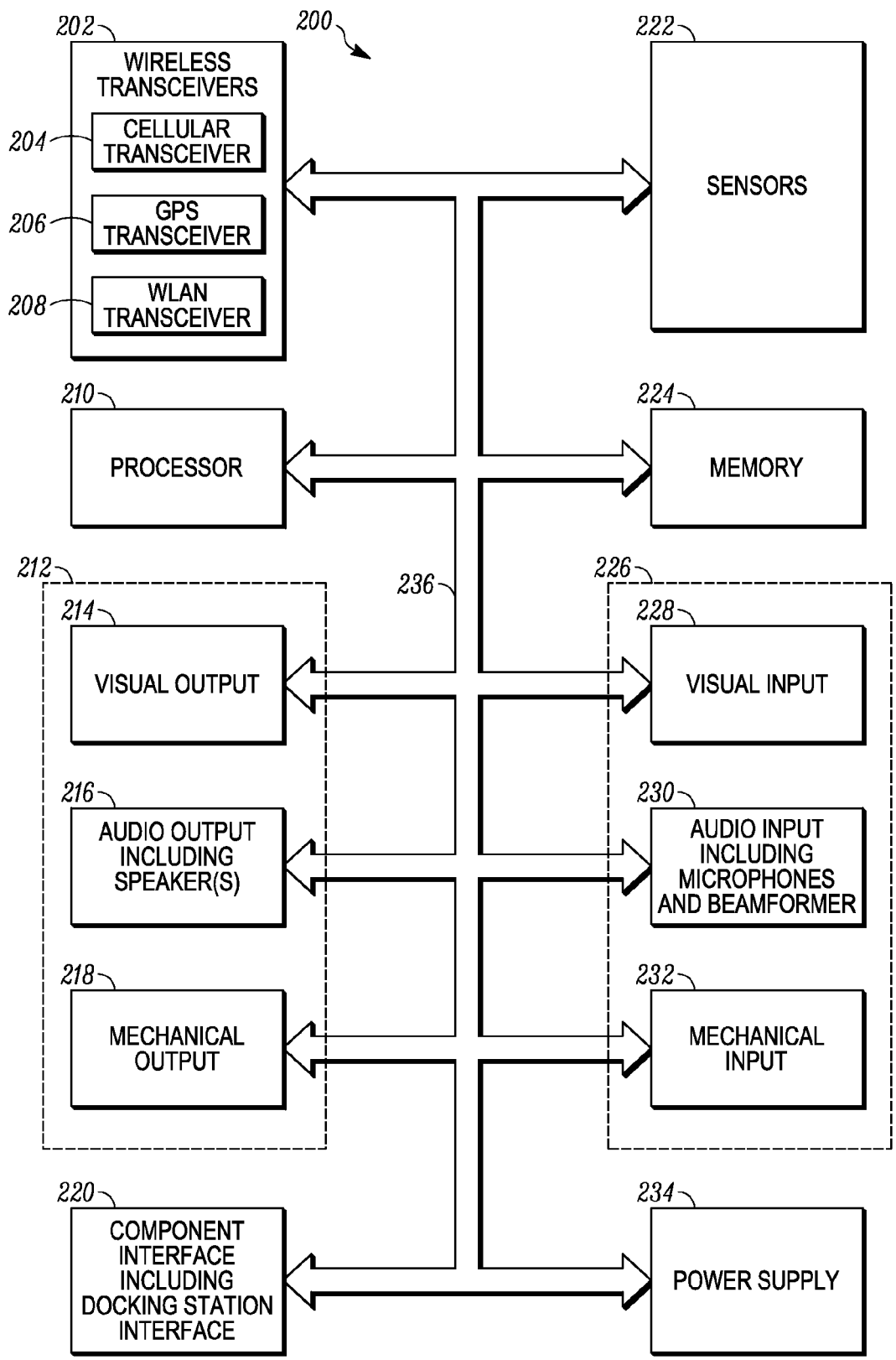
FIG. 2 is a block diagram showing example components of a mobile device illustrated in FIG. 1.

Referring now to FIG. 2, there is provided a block diagram illustrating example internal components 200 of the mobile device 104 of FIG. 1, in accordance with the present embodiment. The mobile device 104 is intended to be representative of a variety of mobile devices including, for example, cellular telephones, personal digital assistants (PDAs), smart phones, or other handheld or portable electronic devices. In alternate embodiments, the mobile device is an audio- or video-file player such as a MP3 player, a personal media player (PMP) or an iPOD™; a navigation device; or another mobile device capable of or configured to receive voice input or other sound inputs that are indicative or representative of vocalized information. Moreover, embodiments of the present disclosure are intended to be applicable to any of a variety of electronic devices that are capable of or configured to perform voice recognition processes on the received voice input or other sound input.

As shown in FIG. 2, the internal elements or components 200 include one or more wireless transceivers 202, one or more processors 210, output components 212, a component interface 220, one or more sensors 222, a memory component 224, input components 226, and a power supply 234. As further illustrated, the internal components 200 are coupled to one another, and in communication with one another, by way of one or more internal communication links 236, for instance an internal bus. A limited number of device components 202, 210, 212, 220-226, and 234 are shown at 200 for ease of illustration, but other embodiments may include a lesser or greater number of such components in a device, such as device 104. Moreover, other elements needed for a commercial embodiment of a device that incorporates the components shown at 200 are omitted from FIG. 2 for clarity in describing the enclosed embodiments.

We now turn to a brief description of the components within the schematic diagram 200. In general, the processor 210, component interface 220, and input components 226 (particularly audio input components 230) are configured with functionality in accordance with embodiments of the present disclosure as described in detail below with respect to the remaining FIGS. 3-7. "Adapted," "operative," "capable" or "configured," as used herein, means that the indicated elements or components are implemented using one or more hardware devices such as one or more operatively coupled processing cores, memory devices, and interfaces, which may or may not be programmed with software and/or firmware as the means for the indicated elements to implement their desired functionality. Such functionality is supported by the other hardware shown in FIG. 2, including the device components 202, 212, 222, 224, and 234.

Continuing with the brief description of the device components shown at 200, as included within the device 104, the wireless transceivers 202 particularly include a cellular transceiver 204, a Global Positioning System (GPS) transceiver 206, and a wireless local area network (WLAN) transceiver 208. More particularly, the cellular transceiver 204 is configured to conduct cellular communications of data over the wireless connections 120 using any suitable wireless technology, such as Third Generation (3G), Fourth Generation (4G), 4G Long Term Evolution (LTE), vis-à-vis cell towers or base stations, such as the base station 118. In other embodiments, the cellular transceiver 204 is configured to utilize any of a variety of other cellular-based communication technologies such as analog communications (using Advanced Mobile Phone System—AMPS), digital communications (using Code Division Multiple Access (CDMA), Time Division Multiple Access (TDMA), Global System for Mobile communication (GSM), integrated Digital Enhanced Network (iDEN), General Packet Radio Service (GPRS), Enhanced Data for GSM Evolution (EDGE), etc.), and/or next generation communications (using Universal Mobile Telecommunication System (UMTS), Wideband CDMA (WCDMA), LTE, Institute of Electrical and Electronics Engineers (IEEE) 802.16, etc.) or variants thereof.

By contrast, the WLAN transceiver 208 is a Wireless Fidelity (Wi-Fi) transceiver 208 configured to conduct Wi-Fi communications in accordance with the IEEE 802.11(a, b, g, or n) standard with access points. In other embodiments, the WLAN transceiver 208 instead (or in addition) conducts other types of communications commonly understood as being encompassed within Wi-Fi communications such as some types of peer-to-peer (e.g., Wi-Fi Peer-to-Peer) communications. Further, in other embodiments, the Wi-Fi transceiver 208 is replaced or supplemented with one or more other wireless transceivers configured for non-cellular wireless communications including, for example, wireless transceivers employing ad hoc communication technologies such as HomeRF (radio frequency), Home Node B (3G femtocell), Bluetooth and/or other wireless communication technologies such as infrared technology.

Moreover, the transceivers 202 enable the determination of the geographic location of the mobile device 104. This is accomplished, for example, using the GPS transceiver 206 and/or the cellular transceiver 204. In one particular embodiment, the cellular transceiver 206 is configured to receive the geographic location of the device 104 from a second device, such as the base station 118. Similarly, in another embodiment, the WLAN transceiver 208 is configured to receive the geographic location of the device 104 from a second device, such as a Wi-Fi router installed in a fixed location. In yet another embodiment, the transceivers function as a device location module configured to determine the geographic location of the device. In one particular embodiment, the device location module includes the GPS transceiver. In another embodiment, the device location module includes a multi-angulation circuit. For example, the cellular transceiver 206 is part of the multi-angulation circuit, which may use multi-angulation techniques such as triangulation to determine a position of the device 104.

The processor 210 includes arithmetic logic and registers necessary to perform the digital processing required by the device 104 to process audio data to, for instance, improve voice recognition in a manner consistent with the embodiments described herein. For one embodiment, the processor 210 represents a primary microprocessor of the device 104 such as an application processor of a smartphone 104. In another embodiment, the processor 210 is an ancillary processor, separate from a central processing unit (CPU, not shown), which is dedicated to providing the processing capability, in whole or in part, needed for the device elements 200 to perform their intended functionality.

In a particular embodiment, the processor 210 includes a voice recognition module having elements needed to process voice data by recognizing words. In one embodiment, processing voice data includes converting speech to text. This type of processing is used, for example, when one is dictating a text message. In another embodiment, processing voice data includes identifying commands from speech. This type of processing is used, for example, when one wishes to give a verbal instruction or command, for instance to the device 104. For different embodiments, the voice recognition module can include a single or multiple voice recognition engines of varying types that are best suited for a particular task or set of conditions. For instance, certain types of voice recognition engines might work best for speech-to-text conversion, and of those voice recognition engines, different ones might be optimal depending on the specific characteristics of a voice or the speech such as a language spoken or accent.

In the embodiment shown, the output components 212 include: one or more visual output components 214 such as a liquid crystal display and/or light emitting diode indicator; one or more audio output components 216 such as a speaker, alarm, and/or buzzer; and one or more mechanical output components 218 such as a vibrating mechanism. Similarly, the input components 226 include one or more visual input components 228 such as a camera lens and photosensor; one or more acoustic or audio input components 230 such as one or more transducers (e.g., microphones), including for example a microphone array and beamformer arrangement or a microphone of a Bluetooth headset; and one or more mechanical input components 232 such as a touchscreen display, a flip sensor, keyboard, keypad selection button, and/or switch.

As mentioned above, this embodiment of internal components 200 also includes one or more of various types of sensors 222 as well as a sensor hub to manage one or more functions of the sensors. The sensors 222 include, for example, proximity sensors (e.g., a light detecting sensor, an ultrasound transceiver or an infrared transceiver), touch sensors, altitude sensors, an accelerometer, a tilt sensor, a gyroscope, to name a few. The sensors 222 are used in part to determine the orientation of the device relative to the earth in order to provide the correct beamform for the device location regardless of which edge of the device is pointing up. In one embodiment, a certain subset of microphones may be used if the device is in landscape mode, while another possible orthogonal subset of microphones may be used when the device is in portrait mode. Alternatively, a single subset of microphones may be used with a reordering of the elements in the beamform calculations to effectively handle the difference between the device being oriented top-side-down, or top-side-up.

The memory component 224 encompasses, in some embodiments, one or more memory elements of any of a variety of forms, for example read-only memory, random access memory, static random access memory, dynamic random access memory, etc. In an embodiment, the processor 210 uses the memory component 224 to store and retrieve data. In some embodiments, the memory component 224 is integrated with the processor 210 into a single component such as on an integrated circuit. However, such a single component still usually has distinct portions/sections that perform the different processing and memory functions.

The data that is stored by the memory component 224 includes, but need not be limited to, operating systems, programs (applications), and informational data. Each operating system includes executable code that controls basic functions of the mobile device 104, such as interaction among the various components included among the internal components 200, communication with external devices via the wireless transceivers 202 and/or the component interface 220, and storage and retrieval of programs and data, to and from the memory component 224. As for programs, each program includes executable code that utilizes an operating system to provide more specific functionality, such as file system service and handling of protected and unprotected data stored in the memory component 224. Such programs include, among other things, programming for enabling the mobile device 104 to perform methods or processes such as those described below by reference to FIGS. 3-7. Finally, with respect to informational data, this is non-executable code or information that an operating system or program references and/or manipulates, in one embodiment, for performing functions of the mobile device 104.

In an embodiment, the component interface 220 provides a direct connection to auxiliary components or accessories for additional or enhanced functionality. The component interface 220 at the least includes a docking interface that is configured to detect coupling of the mobile device 104 to a docking station, such as the docking station 106 within the vehicle 112. The power supply 234, such as a battery, provides power to the other internal components 200 while enabling the mobile device 104 to be portable.

Figure 3:
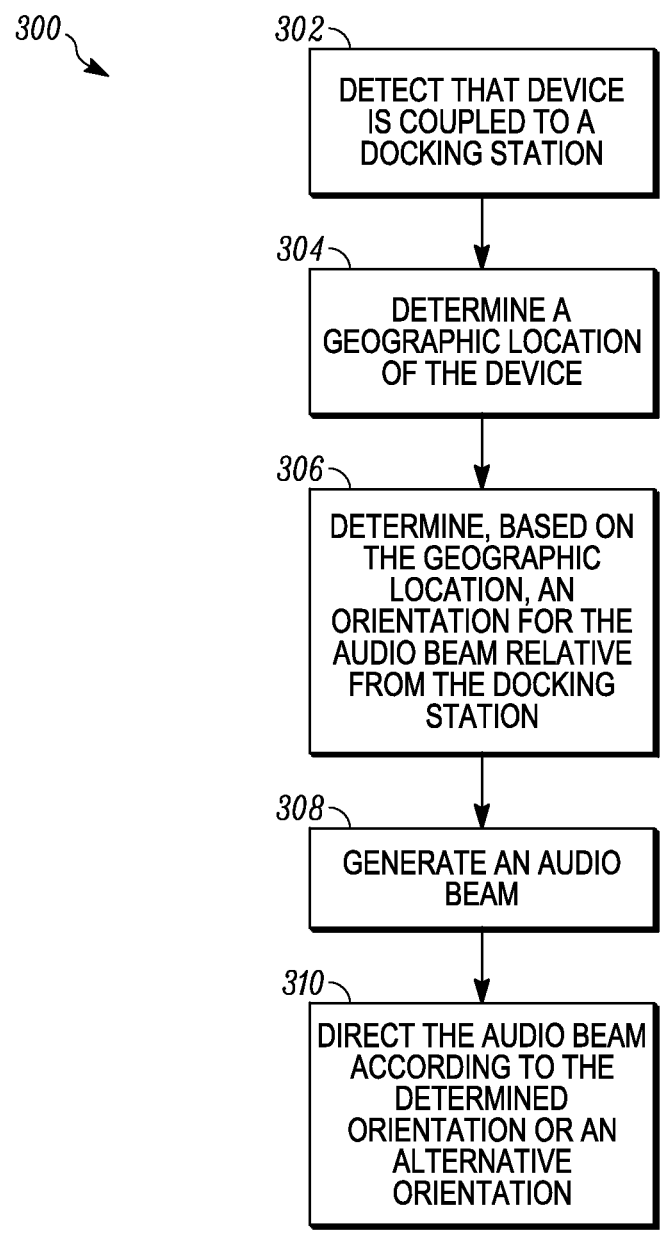
FIG. 3 is a flow diagram showing one embodiment of a general method for adjusting an audio beam orientation based on device location in accordance with the present teachings.

We turn now to a detailed description of the functionality of the device 104 and device components 200 shown in FIGS. 1 and 2, respectively, in accordance with the teachings herein and by reference to the remaining figures. FIG. 3 is a logical flow diagram illustrating a general method 300 performed by a device, such as the device 104, for orienting an audio beam generated by the device. Accordingly, the device detects 302 that it is coupled to a docking station. In a particular embodiment, the device detects that it is coupled to a docking station within a motor vehicle, such as the docking station 106 in the vehicle 112. For example, the docking interface of the component interface 220 is configured with circuitry that communicates data with the docking station 106. Such data includes, in one example implementation, data identifying the device 104 to the docking station 106 and/or data identifying the docking station 106 to the device 104.

The device further determines 304 a geographic location of the device. This can be done using, for example, one or more of the techniques described above including, but not limited to, GPS location techniques, multi-angulation (e.g., triangulation) techniques, and/or receiving location information such as a GSM country code or some type of cellular identification code correlated to location information, by way of example, from the base station 118. The device determines 306 an orientation for an audio beam relative from the docking station, based on the geographic location of the device, which may include or be associated with a county or a region. Such a determination can be performed using a processor, e.g. 210, coupled to the docking interface and the beamformer of the device. Embodiments of determining the orientation of the audio beam are described later by reference to the remaining figures.

The device is configured with a beamformer to generate 308 an audio beam, which is also referred to herein as an audio beamform, a microphone speech beamform, a speech beamform, or simply a beamform. Beamforming is used in an attempt to improve the quality of a received audio signal such as voice to optimize features of an electronic device such as voice recognition. More particularly, in a device having a microphone array, one or more or the plurality of microphones within the array receives audio input such as voice or vocalized speech and/or ambient noise to form or generate a virtual audio beam, which has a set of characteristics. The set of characteristics of the audio beam include, by way of example, a direction or orientation, a shape, and strength.

The shape and strength of the audio beam is, in one embodiment, determined, at least in part, by the number of microphones in the array. In a further embodiment, the direction of the audio beam is determined, at least in part, by a beamforming algorithm applied in the beamformer hardware, wherein the direction may be measured as an angle relative from a center line or axis associated with the device. For example, the direction can be measured from a center axis through the microphone array of the device, from a center line through a docking station coupled to the device, etc.

In general, the beamforming algorithm applies a gain (e.g., an amplitude and/or phase adjustment) to acoustic signals received from one direction, such as the direction of the driver 100 or the passenger 102 of the vehicle 112, over signals originating from other directions. This is done in order to steer, direct or orient the audio beam in a certain direction to favor or enhance the audio signal received from that direction. Accordingly, steering, directing, or orienting an audio beam in or according to a direction, for instance, of a desired audio source includes favoring, enhancing, or applying gain to signals emanating from that direction.

For one embodiment, the device 104 uses the multiple acoustic transducers in the microphone array such that audio signals originating from the direction of interest or the desired direction experience constructive interference. Correspondingly, audio signals originating from other directions may experience destructive interference to comparatively diminish those signals. The correct timing that produces constructive interference can be achieved from physical path differences resulting from the spatial arrangement of the acoustic transducers and/or by altering a signal's amplitude and/or phase by changing beamforming filter coefficients. An adaptive beamformer uses a set of weightings and time delays to adjust the filter coefficients of the beamformer.

In one example implementation scenario, the processor directs or orients 310 the audio beam according to the orientation determined at 306, which is based on the country or region. In an alternative implementation scenario, the device determines that there is an alternative orientation for the audio beam, and, in addition to or instead, directs 310 the audio beam according to the alternative orientation.

Figure 4:
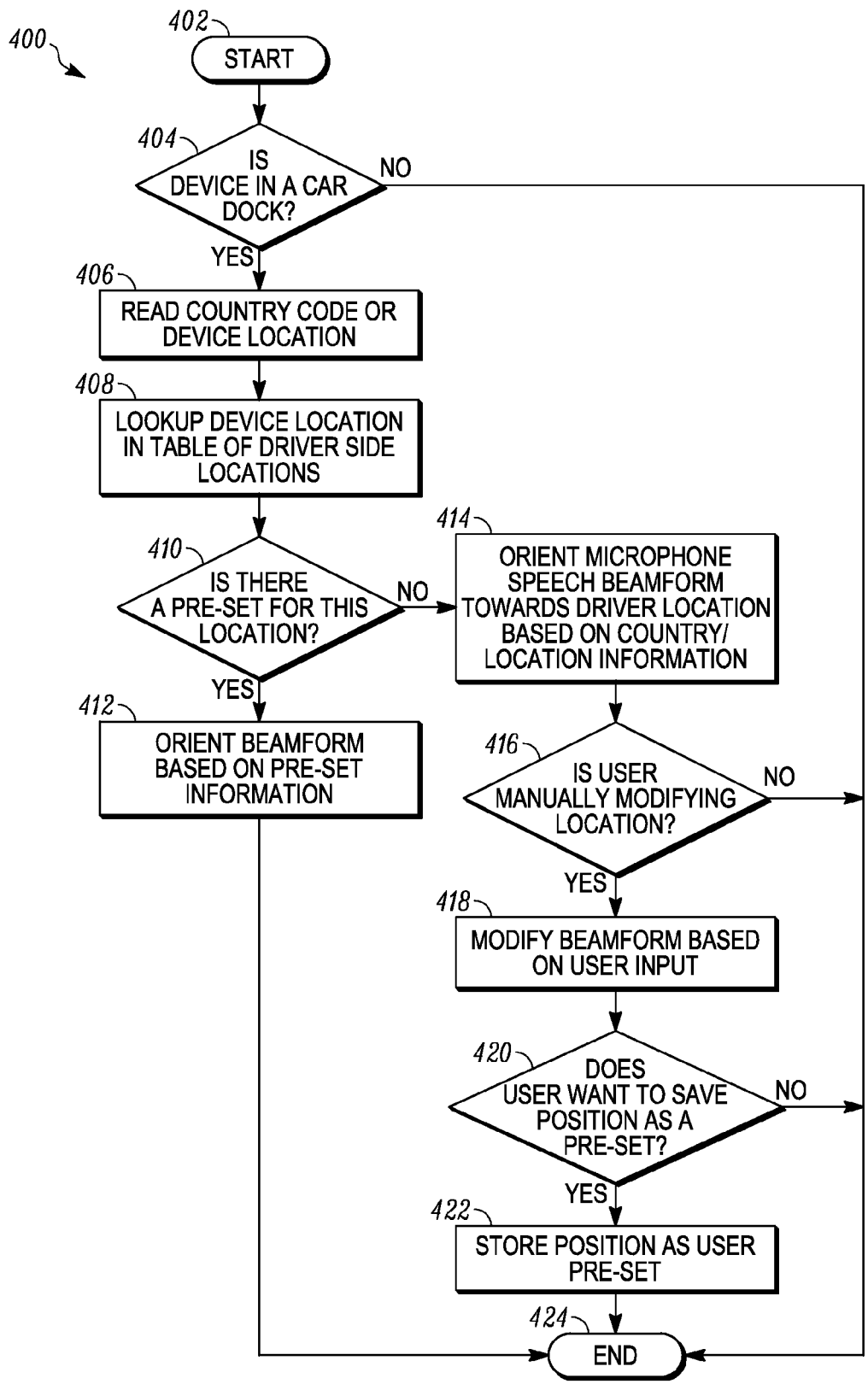
FIG. 4 is a flow diagram showing another embodiment of a method for adjusting an audio beam orientation based on device location in accordance with the present teachings.
Figure 5:
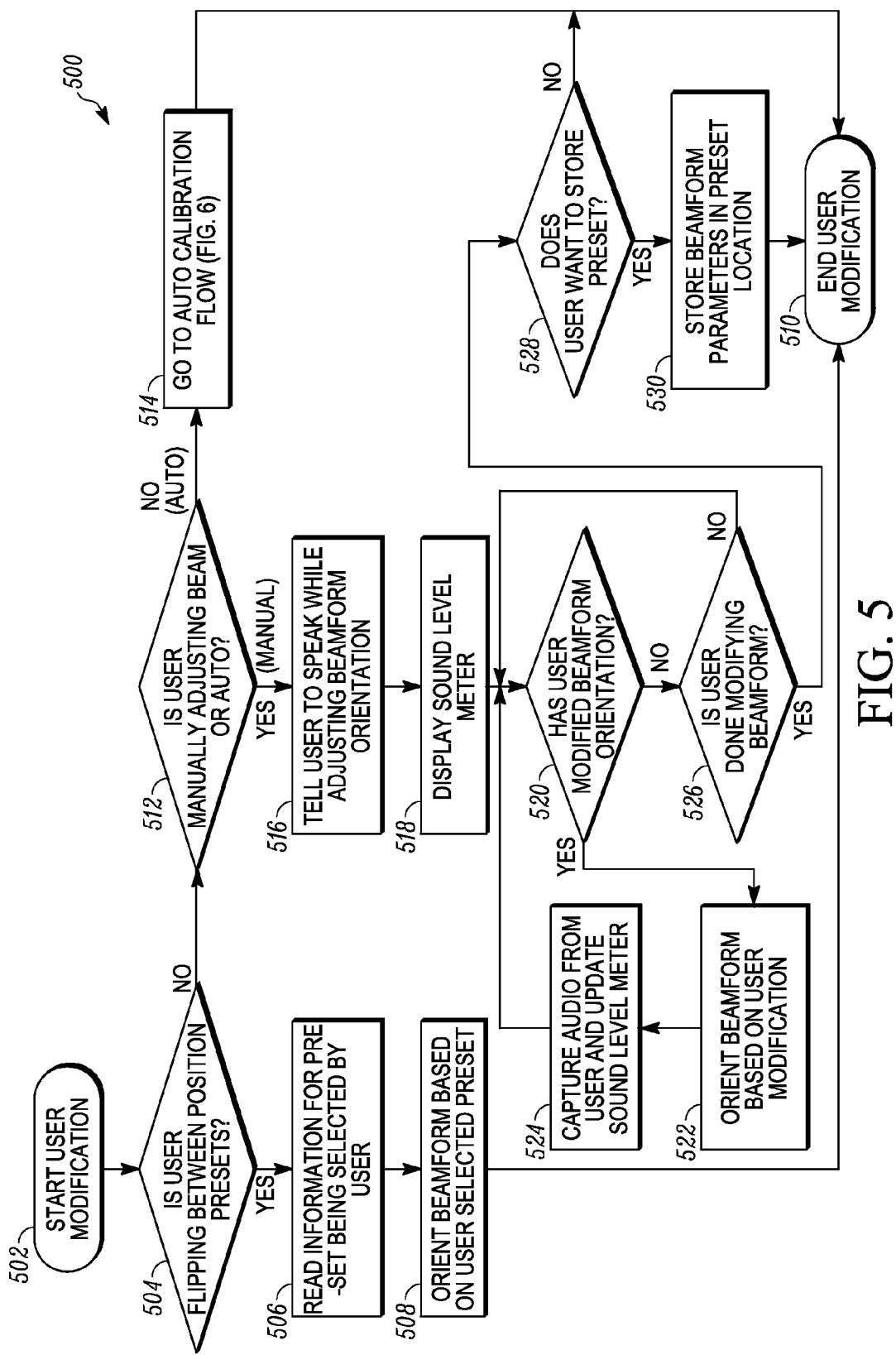
FIG. 5 is a flow diagram showing another embodiment of a method for adjusting an audio beam orientation based on device location in accordance with the present teachings.
Figure 6:
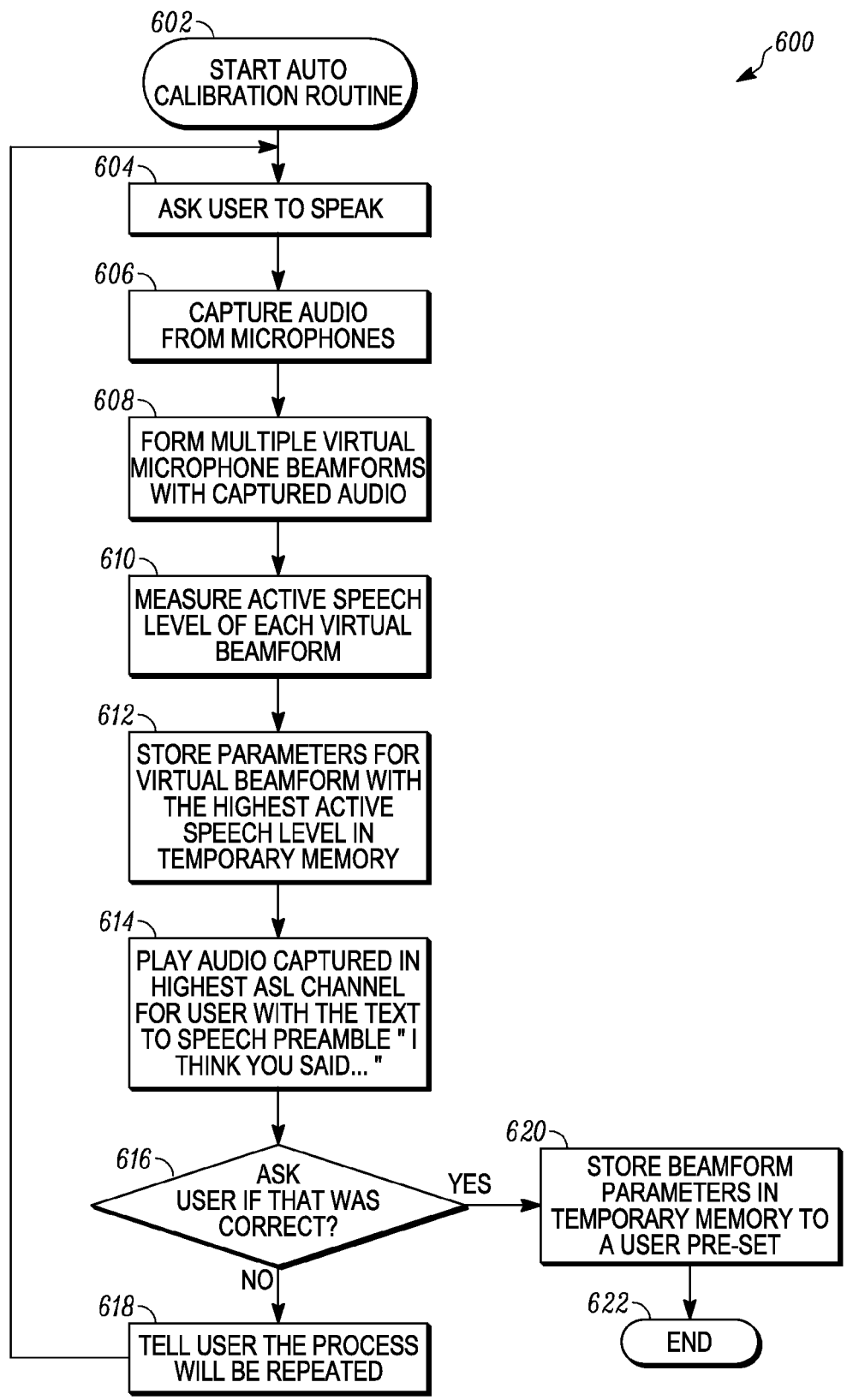
FIG. 6 is a flow diagram showing another embodiment of a method for adjusting an audio beam orientation based on device location in accordance with the present teachings.

FIGS. 4-6 illustrate logical flow diagrams showings three detailed methods 400, 500, and 600, respectively, performed in a device such as a device 104 of FIG. 1 for orienting an audio beam in accordance with the present teachings. More particularly, upon starting 402 the method 400, the docking interface 220 determines 404 whether the device 104 is in a vehicle dock or docking station such as the car dock 106. If the device 104 is in the car dock, the processor 210 reads 406 a country code or device location, for instance from the location module such as the location module described above.

The processor 210 determines 408 a normal or expected driver side for the geographic location. This can be done, for example, by consulting a table or other data structure containing a list of countries and corresponding country-designated driver sides for those countries. All or portions (for instance in the form of updates) of this country/driver side data can be preprogrammed into the memory component 224 during manufacturing or downloaded by the user for example from the Internet. In this implementation, the processor determines 408 that the device 104 is located in a right-hand traffic country, such as the United States or Canada, with the driver side 110 on the left-hand side of the vehicle 112.

Thus, in this scenario, the processor 210 can determine an orientation for the beamform, for instance a microphone speech beamform generated by speech from a user, e.g., 100 or 102, within the vehicle 112, to be toward the driver side of the vehicle, which in this case is correspondingly toward the left-hand side 110 of the vehicle. Accordingly, in this case, the determined orientation (referred to herein as a default orientation) is based on an expected location of a driver side within a motor vehicle, and the expected location of the driver side is based on the geographic location of the device. Moreover, the geographic location is associated with a geographic region, in this case a country, which is further associated with a first driver side (e.g., the left-hand side) of the motor vehicle as opposed to a second and opposing driver side (e.g., the right-hand side) of the motor vehicle.

Before orienting the beamform toward the left-hand side of the vehicle 112, however, the processor 210 determines 410 whether there is an alternative orientation indicated for the beamform. In an embodiment, the memory component 224 may store one or more "pre-set" (for instance stored or set by a user) orientations that differ from the default orientation determined and/or stored based on the device location, dock that the phone is attached to, or user of the phone. Thus, the alternative orientation is carried out using a stored pre-set orientation. In one example scenario, the user has previously manually adjusted and stored an alternative orientation for when the device 104 is used in the detected country location. In an embodiment, perhaps, the user always or nearly always visits the United States Virgin Islands and never or rarely visits the continental United States. Therefore, the user stores a pre-set for the United States having different beamform parameters (e.g., filter or gain coefficients) than the default parameters for a left-hand driver side. Namely the user stores a preset having beamform parameters that direct the beamform to a right-hand driver side.

In an alternative embodiment, the device 104 may belong to a user who does not drive, resulting in a preset that would direct the beam towards the passenger side of the car. This embodiment may define this passenger preset as a predetermined angle from the centerline of the device opposite the driver position determined at 408 or a fixed position relative to the docked device regardless of the device location determined at 406. The preset predetermined angle from the centerline of the device opposite the driver position would allow for passenger use in any vehicle in any location. In this embodiment, the audio beam is directed relative to the determined orientation as opposed to along the determined orientation. The fixed position relative to the docked device regardless of the device location would prevent the beamform in a device from switching sides in a single vehicle that is being driven from one geographic region to another.

Where the processor 210 determines that there is an alternative beamform orientation, the processor 210 directs 412 the beamform according to the alternative orientation using the pre-set beamform parameters and exits 424 method 400. This, in essence, serves as an override to the default beamform parameters for a given jurisdiction. FIGS. 5 and 6 illustrate two example detailed embodiments, in FIG. 5 of manually setting an alternative beamform location for a country and in FIG. 6 of automatically setting an alternative beamform location for the country. For example, the alternative orientation is based on input received through a user interface such as a touchscreen, keyboard, and/or manual switch.

In one particular embodiment, the user input is received using a virtual sliding bar on the user interface. This embodiment is shown and described in detail below by reference to FIG. 7. In another embodiment, the user input includes a selection of one of multiple audio beam orientations stored on the device, as described below by reference to FIG. 5. For example, at least some of the multiple stored audio beam orientations are associated with different motor vehicles. In yet another embodiment, the user input initiates an auto-calibration procedure to generate the alternative orientation based on speech input, as described below in detail by reference to FIG. 6. Otherwise, where the processor 210 determines 410 that there is no alternative orientation pre-set for this country, the processor 210 orients 414 the beamform toward the left-hand driver side 110 of the vehicle 112, in this case, based on the location, e.g., country, information for the device 104. In this embodiment, the audio beam is directed along or according to the determined orientation.

However, the user may desire at some point to change beamform parameters on the device 104 for one or more regions from the default beamform parameters for that region. In such a case, the processor 210 monitors 416 for an audio beam modification input, and modifies 418 the orientation of the beamform according to the modification input. The processor 210 detecting such a modification input based on a user's manual input and responsively modifying the beamform parameters based on the user input is described in detail below by reference to FIG. 5. In one example scenario, the audio beam modification input is based on a passenger 102 location on a passenger side 108 within the motor vehicle 112. Where the user has not modified the default orientation, at 416, the device 104 uses the default beamform parameters to direct the beamform and ends 424 the method 400.

In a further embodiment, where the beamform is directed using the modified beamform parameters that were determined based on the user input, the processor 210 provides a prompt (e.g., to a user via an output component 212) to select whether to save the modified beamform parameters. For example, one or more such prompts may be provided via a user interface on the device 104, such as a visual prompting, e.g., in the form of a virtual icon on a display, an audio prompting through a speaker, etc. Where the processor 210 determines 420 that an input was received in response to the prompt to save the modified beamform parameters as a preset, the processor 210 proceeds to store 422 these parameters. Otherwise, the processor 210 operates using the current modified beamform parameters until the device 104 is again detected 404 as being coupled to a docking station.

Turning now to FIG. 5, and as mentioned above, illustrated therein is a method 500 for modifying, based on manual user input, default beamform parameters corresponding to a default beamform orientation for a region. In one implementation scenario a driver, e.g., 100, interacts with a device docked in the docking station of the vehicle (while the vehicle is at a standstill) to cause the performance of method 500. Alternatively a passenger, e.g., 102, interacts with the device to cause the performance of method 500.

The method starts at 502. Thereafter, the processor 210 determines 504 whether a selection has been made from multiple pre-set alternative beamform parameters for a current geographic location of a device. Where the processor 210 has received an input that selects one of the multiple alternative beamform orientations, the processor 210 reads 506 the stored alternative beamform parameters is order to orient 508 the generated beamform using the selected beamform orientation. The processor, in one embodiment, then exits 510 the method 500.

For example, the user drives multiple vehicles in the United States, and the docking station is located in different areas within each of these vehicles. Therefore, the user has previously caused the device, either automatically (FIG. 6) or through manual user input (FIG. 5) to determine and store in the memory component 224 different beamform parameters associated with each vehicle to optimize receipt of audio signals from the left-hand driver side, depending on the particular vehicle in which the device is docked. In an alternative embodiment, the device communicates with the docking station to determine the particular vehicle in which the device is docked and automatically selects the proper stored alternative beamform orientation.

Where the processor 210 fails to detect 504 the selection of a pre-set alternative beamform orientation, the processor determines 512 whether it is receiving a manual adjustment from a user interface. If such a manual adjustment is not received, the processor 210 in one embodiment (for instance where the user has directed the device or without further user input) proceeds 514 to automatically create alternative beamform parameters for the device location in accordance with a method 600 illustrated by reference to a flow diagram shown in FIG. 6 and exits 510 method 500. Turning back to 512, where manual user input is detected, the processor 210 prompts the user to interact with the device, as illustrated in one particular embodiment by reference to FIG. 7 and as described by reference to the remaining functionality of method 500 illustrated in FIG. 5.

More particularly, FIG. 7 shows a user 704 interacting with a device 702 to manually create alternative beamform parameters and, correspondingly, an alternative beamform orientation based on manual user input. As shown, the device 702 includes: a display 710, which in this instance is a touchscreen display; and a microphone 708 that accepts audio input, such as the user's vocalized speech 706, into a microphone array supported by a beamformer. As further shown, the device 702 includes one or more speakers and a manual input component 712, which in this case includes a keypad.

Turning back to method 500, the processor 210 causes the device 702 to provide a prompt 516, e.g., to the user 704 for speech input 706 while simultaneously adjusting the beamform orientation. For example, such a prompt 516 may be displayed on the display 710 as a visual icon or in written text and/or the prompt 516 may be an audio prompt from one or more of the speakers on the device 702. In the particular embodiment illustrated, a virtual slide bar 714 is displayed on the touchscreen display 710 as well as a virtual sound level meter 716, at 518. In response 520 to tactile input from the user's finger 718 (or a stylus in another example implementation scenario), while the user 704 is speaking 706 into the microphone 708, the beamformer correspondingly adjusts 522 the orientation of the beamform generated as a result of the audio input 706.

Moreover, the processor 210 causes 524 the beamform orientation adjustment to be presented on a visual output 214 of the device 702, for instance as reflected in the virtual sound level meter 716. This provides an indication of the received audio quality as a direct consequence of the user's input onto the virtual slide bar 714 and corresponding adjustment of the beamform orientation, while speaking into the device. As a result of interacting with the device 702 to cause the device to perform functions 520-524 one or more times, the user 704 can manually optimize the beamform orientation for a given use case for the current device location. A graphical user interface displaying the virtual slide bar 714 communicatively coupled to the virtual sound level meter 716 is shown in this particular embodiment. However, additional embodiments can be envisioned that use different arrangements to receive the user input and indicate the corresponding beamform orientation adjustments. Such alternative arrangements may include, for example, one or more mechanical switches to adjust the beamform orientation, an analog meter to indicate the corresponding sound level, etc.

When the processor 210 fails to detect 526 additional user input, the processor 210 determines whether it has received 528 an indication to store the alternative beamform orientation. If such an indication has been received, the processor 210 proceeds to store 530 the modified beamform parameters associated with the current device location into the memory component 224. Otherwise, the processor 210 exits 510 the method 500 and continues to operate using the current modified beamform parameters until the device is again detected 404 (FIG. 4) as being coupled to a docking station.

Turning finally to FIG. 6, the automatic calibration method 600 starts at 602 and is also explained at least in part by reference to FIG. 7. Accordingly, the processor 210 provides 604 a prompt for user speech 706, which is captured 606 by at least the microphone 708 of the microphone array in the device 702. In this embodiment, the beamformer automatically, e.g., through a stored algorithm that selects various filter coefficients, determines 608 multiple alternative beamform orientations for the captured audio 706 and selects one of these beamform orientations to provide an output that reflects the selected beamform orientation.

Any suitable algorithm can be used to implement the method 600. However, in the particular embodiment illustrated, the processor 210 measures 610 an active speech level (ASL) of each of the determined beamform orientations. The processor 210 selects a beamform orientation associated with the highest ASL and temporarily stores 612 the corresponding beamform parameters. The ASL measured for a given beamform orientation is referred to as the channel's ASL. At 614, the processor 210 provides an audio output of the captured user speech from the beamform, or channel, with the highest ASL. In a further embodiment, the processor 210 causes the output of the captured audio to be preceded with a preamble to prompt a user response. In this example implementation, the preamble is "I think you said."

Where the user response, which can be an audio response into the microphone 708 or a response using another input component on the device 702, provides an indication 616 to the processor 210 that the audio output provided at 614 accurately reflected the user's speech 706, the processor 210 writes 620 the beamform parameters of the virtual beamform with the highest ASL, which have previously been stored in the temporary storage, to a pre-set for the current device location. The method 600 then ends at 622. Otherwise, the processor 210 repeats functions 604-616 of method 600, of which it notifies 618 the user 704 in one embodiment, until the user speech 706 is affirmed at 616 as being accurately reflected by the audio output provided at 614.

In the foregoing specification, specific embodiments have been described. However, one of ordinary skill in the art appreciates that various modifications and changes can be made without departing from the scope of the teachings as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The embodiments are defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . .

. a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for orienting an audio beam generated by a device, the method comprising:
    detecting that the device is coupled to a docking station;
    determining a geographic location of the device;
    determining, based on the geographic location of the device, an orientation for an audio beam relative from the docking station;
    generating the audio beam by the device.

2. The method of claim 1 further comprising directing the audio beam according to the determined orientation.

3. The method of claim 2, wherein detecting that the device is coupled to a docking station comprises detecting that the device is coupled to the docking station within a motor vehicle.

4. The method of claim 3, wherein the determined orientation is based on an expected location of a driver side within the motor vehicle, and wherein the expected location of the driver side is based on the geographic location of the device.

5. The method of claim 4, wherein the geographic location comprises a geographic region, which is associated with a first driver side of the motor vehicle or a second and opposing driver side of the motor vehicle.

6. The method of claim 5, wherein the geographic region comprises a country.

7. The method of claim 2 further comprising:
    monitoring for an audio beam modification input;
    modifying the orientation of the audio beam according to the modification input.

8. The method of claim 7, wherein the audio beam modification input is based on a passenger location within a motor vehicle.

9. The method of claim 1 further comprising:
    determining that there is an alternative orientation;
    directing the audio beam according to the alternative orientation.

10. The method of claim 9, wherein the geographic location comprises a country or a region, and the determined orientation is based on the country or the region.

11. The method of claim 10, wherein the alternative orientation is based on input received through a user interface.

12. The method of claim 11, wherein the input is received using a virtual sliding bar on the user interface.

13. The method of claim 11, wherein the input comprises a selection of one of multiple audio beam orientations stored on the device.

14. The method of claim 13, wherein at least some of the multiple stored audio beam orientations are associated with different motor vehicles.

15. The method of claim 11, wherein the input initiates an auto-calibration procedure to generate the alternative orientation based on speech input.

16. The method of claim 11 further comprising presenting, on a visual output of the device, an indication of received audio quality as a consequence of the input received through the user interface and the corresponding alternative orientation.

17. The method of claim 10, wherein the alternative orientation comprises a stored pre-set orientation.

18. The method of claim 1 further comprising directing the audio beam relative to the determined orientation.

19. A device configured for audio beam orientation adjustment, the device comprising:
    a docking interface configured to detect coupling of the device to a docking station;
    a beamformer configured to generate an audio beam;
    a processor coupled to the docking interface and the beamformer and configured to determine, based on a geographic location of the device, an orientation for the audio beam relative from the docking station.

20. The device of claim 19 further comprising a receiver coupled to the processor and configured to receive the geographic location of the device from a second device.

21. The device of claim 19 further comprising a device location module coupled to the processor and configured to determine the geographic location of the device.

* * * * *